(12) United States Patent
Tanizawa et al.

(10) Patent No.: US 9,191,406 B2
(45) Date of Patent: Nov. 17, 2015

(54) MESSAGE RELAYING APPARATUS, COMMUNICATION ESTABLISHING METHOD, AND COMPUTER PROGRAM PRODUCT

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1523 days.

(21) Appl. No.: 11/940,054

(22) Filed: Nov. 14, 2007

(65) Prior Publication Data

US 2008/0235381 A1 Sep. 25, 2008

(30) Foreign Application Priority Data

Mar. 19, 2007 (JP) ................. 2007-070315

(51) Int. Cl.
*G06F 15/16* (2006.01)
*H04L 29/06* (2006.01)
*H04L 29/08* (2006.01)

(52) U.S. Cl.
CPC .......... *H04L 63/166* (2013.01); *H04L 65/1006* (2013.01); *H04L 63/0428* (2013.01); *H04L 65/1069* (2013.01); *H04L 67/2814* (2013.01)

(58) Field of Classification Search
USPC .......................................................... 709/227
See application file for complete search history.

(56) References Cited

U.S. PATENT DOCUMENTS 6,324,177 B1 * 11/2001 Howes et al. ................. 370/389
6,904,140 B2 * 6/2005 Trossen ................... 379/207.04
2002/0091921 A1 * 7/2002 Kunzinger ..................... 713/153
2005/0094582 A1 * 5/2005 Forissier et al. .............. 370/261
2006/0251236 A1 * 11/2006 Peters et al. ............. 379/265.01
2007/0162744 A1 * 7/2007 Hoshino et al. ............... 713/156

FOREIGN PATENT DOCUMENTS

| JP | 2002-218055 | 8/2002 |
|---|---|---|
| JP | 2004-248169 | 9/2004 |
| JP | 2004-312517 | 11/2004 |
| JP | 2007-6306 | 1/2007 |

OTHER PUBLICATIONS

Rosenberg, et al., "RFC3261 SIP: Session Initiation Protocol", http://www.ietf.org/rfc/rfc3261.txt, pp. 1-189, (Jun. 2002).
Notice of Rejection issued by the Japanese Patent Office on Feb. 22, 2011, for Japanese Patent Application No. 2007-070315, and English-language translation thereof.

* cited by examiner

*Primary Examiner* — Andrew Georgandellis
(74) *Attorney, Agent, or Firm* — Finnegan, Henderson, Farabow, Garrett & Dunner, L.L.P.

(57) ABSTRACT

A storage unit of a relaying apparatus stores first identification information that identifies an SIP terminal and second identification that identifies other SIP terminal which is forecast as a transfer destination of a message. A transmitting-and-receiving unit receives from the SIP terminal a request message that is received before a transfer message to be transferred to other SIP terminal and that includes a processing request concerning communications and the first identification information. An obtaining unit obtains from a storage unit the second identification information corresponding to the first identification information included in the received request message. A connection establishing unit establishes communications between the other SIP terminal of the obtained second identification information and the relaying apparatus.

15 Claims, 8 Drawing Sheets

| TLS CONNECTION ID | RECEPTION-TLS CONNECTION ADDRESS/PORT | CONNECTION SOURCE PORT | ENCRYPTION ALGORITHM ID | ENCRYPTION PARAMETER |
|---|---|---|---|---|
| 001 | 192.168.0.100:5061 | 12340 | 03 | XXXXXX |
| 002 | 192.168.0.101:5061 | 5061 | 03 | YYYYYY |
| 003 | 192.168.0.102:12342 | 5061 | 01 | ZZZZZZ |

| RECEPTION-TLS CONNECTION ADDRESS/PORT | FORECAST-SIP MESSAGE TRANSFER DESTINATION |
|---|---|
| 192.168.0.100:5061 | 192.168.0.200:5061 |
| 192.168.0.101:5061 | 192.168.0.102:12342 |
| 192.168.0.102:12342 | 192.168.0.101:5061 |

| METHOD NAME | TRANSFER DESTINATION URL | CONTACT ADDRESS | FORECAST-SIP MESSAGE TRANSFER DESTINATION |
|---|---|---|---|
| PUBLISH | carol@example.com | <any> | 192.168.0.200:5061 |
| REGISTER | alice@example.com | alice@192.168.0.3 | 192.168.0.102:12342 |
| REGISTER | bob@example.com | bob@192.168.0.4 | 192.168.0.101:5061 |

MESSAGE RELAYING APPARATUS, COMMUNICATION ESTABLISHING METHOD, AND COMPUTER PROGRAM PRODUCT

CROSS-REFERENCE TO RELATED APPLICATIONS

This application is based upon and claims the benefit of priority from the prior Japanese Patent Application No. 2007-70315, filed on Mar. 19, 2007; the entire contents of which are incorporated herein by reference.

BACKGROUND OF THE INVENTION

1. Field of the Invention

The present invention relates to an apparatus that establishes communications and relays a message based on the established communications, and a method and a computer program product for establishing communications.

2. Description of the Related Art

In recent years, a Session Initiation Protocol (SIP) has been widely known as a signaling protocol that is present between communication devices and controls and relays communications. A communication system (SIP system) employing the SIP uses an SIP proxy as a communication intermediary server device between SIP terminals as terminal devices. It is a general method to secure communications, using a Transport Layer Security (TLS) protocol as a transport protocol that connects between the SIP terminal and the SIP proxy. The SIP terminal and the SIP proxy are collectively called an SIP entity.

The TLS is a connection-oriented secure transport protocol. To distribute SIP messages using the TLS, a connection needs to be established between SIP entities by executing TLS handshake. J. Rosenberg et al., "RFC 3261, SIP:Session Initiation Protocol", [online], June 2002, retrieved from the Internet: <URL:http://www.ietf.org/rfc/rfc3261.txt> discloses the use of the TLS as the transport protocol for the secure distribution of the SIP messages.

The outline process from when an SIP proxy B receives an SIP message from an SIP terminal A that transmits the SIP message until when the SIP proxy B distributes the SIP message to a destination SIP terminal C is explained next.

First, the SIP terminal A executes the handshake protocol of the TLS with the SIP proxy B. Accordingly, a secure connection is established between the SIP terminal A and the SIP proxy B. Next, the SIP terminal A transmits an SIP message encrypted by the TLS to the SIP proxy B, by using the established secure connection.

The SIP proxy B receives the encrypted SIP message, and fetches the SIP message by decrypting the TLS. The SIP proxy B references a Request-URI included in an SIP header, and determines a distribution destination of the received SIP message. For this purpose, the SIP proxy B can enquire an SIP location server, for example. The SIP proxy B executes the handshake protocol of the TLS with the SIP terminal C as the distribution destination of the SIP message. Accordingly, a secure connection is established between the SIP proxy B and the SIP terminal C.

Next, the SIP proxy B transmits the SIP message encrypted by the TLS, to the SIP terminal C, using the established secure connection. The SIP terminal C transmits an SIP response message, using the TLS connection established between the SIP proxy B and the SIP terminal C. The SIP proxy B distributes the received SIP response message, using the TLS connection established between the SIP terminal A and the SIP proxy B.

As described above, for the SIP proxy B to distribute the SIP message, the connection needs to be established by executing the handshake with each SIP terminal. Because plural messages are mutually exchanged in the handshake protocol, the process requires a certain time to establish the TLS connection.

In general, the SIP proxy cannot specify the destination SIP terminal to which the SIP message is to be distributed, until when the SIP proxy references the SIP header (Request-URI, in general) after receiving the SIP message. Therefore, after receiving the SIP message and after specifying the distribution destination, the SIP proxy needs to distribute the SIP message by establishing the TLS connection to the SIP terminal of the distribution destination.

According to the conventional method, the establishment of the TLS connection is started after specifying the distribution destination by receiving the SIP message. Therefore, a delay in the time required to complete the distribution of the SIP message increases.

The TLS connection does not need to be carried out each time when the SIP message is going to be transmitted. An established TLS connection can be also used to distribute the SIP message by maintaining the TLS connection. However, maintaining plural TLS connections is not desirable, because this compresses the storage capacity of the SIP proxy and the load of a central processing unit (CPU). Therefore, usually, in transmitting an SIP INVITE request message, a new TLS connection is established for each SIP transaction.

SUMMARY OF THE INVENTION

According to one aspect of the present invention, a relaying apparatus that relays a message transmitted and received between terminal devices by established communications, the relaying apparatus includes a storage unit configured to store first identification information for identifying a first terminal device and second identification information for identifying a second terminal device in association with each other, the second terminal device being forecasted as a transfer destination of the message transmitted from the first terminal device; a receiving unit configured to receive from the first terminal device a request message which is received before a transfer message to be transferred to the second terminal device, the request message including a processing request concerning communications and the first identification information; an obtaining unit configured to obtain from the storage unit second identification information corresponding to the first identification information included in the request message received by the receiving unit; and an establishing unit configured to establish communications with the second terminal device identified by the second identification information obtained by the obtaining unit.

According to another aspect of the present invention, a method of establishing communications in a relaying apparatus that relays a message transmitted and received between terminal devices by established communications. The method includes receiving from a first terminal device a request message which is received before a transfer message to be transferred to a second terminal device, the request message including a processing request concerning communications and first identification information for identifying the first terminal device; obtaining from a storage unit second identification information corresponding to the first identification information included in the request message, the storage unit storing the first identification information and second identification information for identifying the second terminal device in association with each other, and the second terminal device being forecasted as a transfer destination of the message transmitted from the first terminal device; and establishing communication with the second terminal device identified by the second identification information.

A computer program product according to still another aspect of the present invention causes a computer to perform the method according to the present invention.

DETAILED DESCRIPTION OF THE INVENTION

Exemplary embodiments of an apparatus that relays a message and a method and a program product for establishing communications according to the present invention will be explained below in detail with reference to the accompanying drawings.

A relaying apparatus according to a first embodiment stores information concerning a TLS connection and an SIP entity of a distribution destination by relating them to each other, forecasts the SIP entity of the distribution destination by referencing the stored information, when a request for establishing the TLS connection is received, and executes beforehand the establishment of the TLS connection between the SIP entity and the relaying apparatus.

Figure 1:
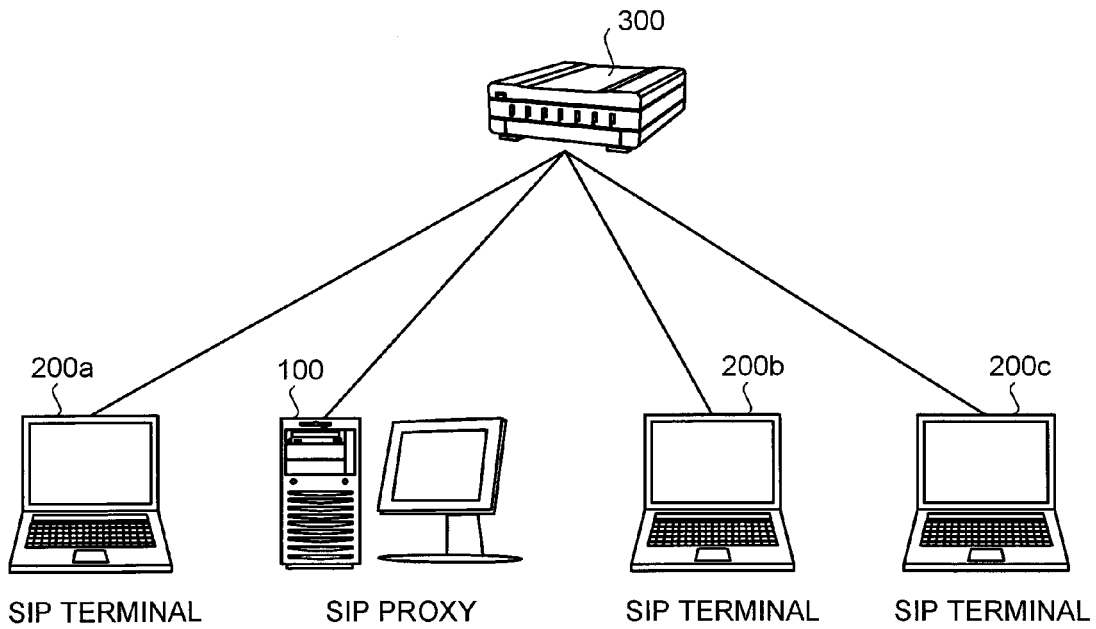
FIG. 1 is a block diagram of a network configuration of a communication system according to a first embodiment of the present invention.

FIG. 1 is a block diagram of a network configuration of a communication system according to the first embodiment. As shown in FIG. 1, the communication system according to the first embodiment has such a configuration that an SIP proxy 100 is connected to plural SIP terminals 200a, 200b, and 200c via a router 300.

The SIP proxy 100 is a relaying apparatus that relays an SIP message to the SIP terminals 200. The SIP proxy 100 establishes a TLS connection based on a TLS protocol, and relays the SIP message based on the TLS connection. A detailed configuration of the SIP proxy 100 is described later.

The SIP terminals 200a, 200b, and 200c are terminal devices that use the SIP as a signaling protocol, and include a user agent (UA) function of the SIP. The SIP terminals 200a, 200b, and 200c have similar configurations, and therefore, are hereinafter also simply referred to as the SIP terminals 200. The number of the connected SIP terminals 200 is not limited to three. A detailed configuration of the SIP terminal 200 is described later.

The router 300 transfers an IP packet between the SIP terminal 200 and the SIP proxy 100, and can be configured by a device conventionally used such as an IP router and a switch.

Figure 2:
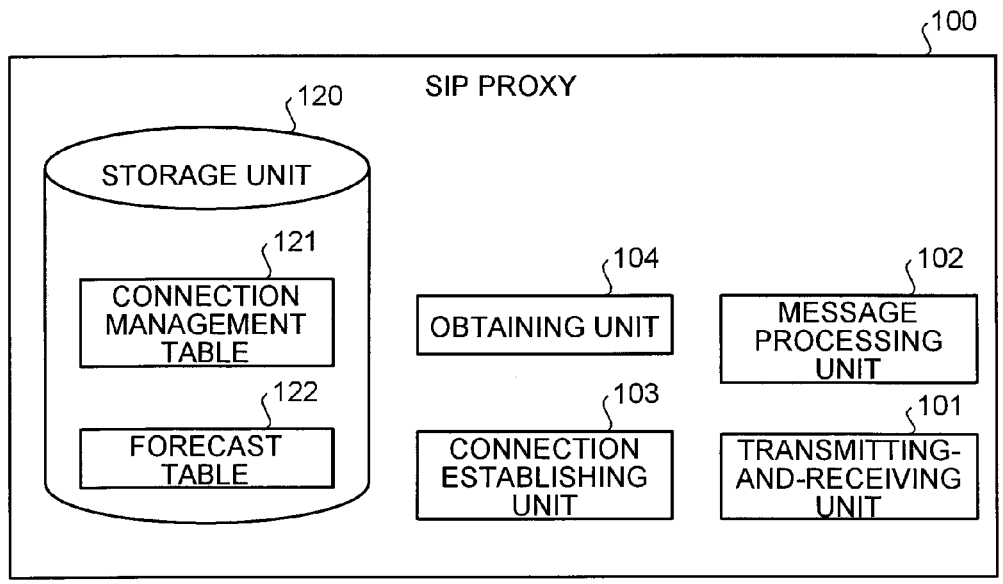
FIG. 2 is a block diagram of a configuration of an SIP proxy according to the first embodiment.

The detailed configuration of the SIP proxy 100 is explained next. FIG. 2 is a block diagram of the configuration of the SIP proxy 100 according to the first embodiment. As shown in FIG. 2, the SIP proxy 100 includes a storage unit 120, a transmitting-and-receiving unit 101, a message processing unit 102, a connection establishing unit 103, and an obtaining unit 104.

The storage unit 120 stores various kinds of information used in the process of relaying a message, and includes a connection management table 121 and a forecast table 122.

Figures 3, 4, 5:
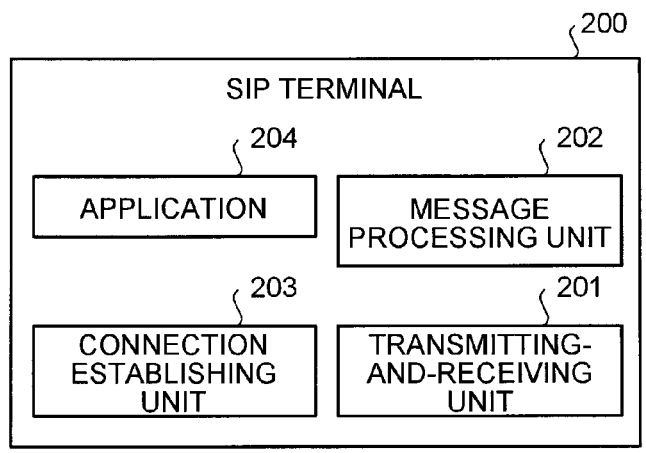
FIG. 3 is a schematic diagram for explaining a detailed data structure of a connection management table.
FIG. 4 is a schematic diagram for explaining a detailed data structure of a forecast table according to the first embodiment.
FIG. 5 is a block diagram of a configuration of an SIP terminal according to the first embodiment.

The connection management table 121 stores information concerning a connection established by the connection establishing unit 103 described later. FIG. 3 is a schematic diagram for explaining a detailed data structure of the connection management table 121.

As shown in FIG. 3, the connection management table 121 holds a TLS connection ID for identifying a connection, a reception-TLS connection address/port, a connection source port that expresses a port of the SIP proxy 100 which becomes a connection source of the TLS connection, an encryption algorithm ID, and an encryption parameter, by relating these items to each other.

The reception-TLS connection address/port is set with the IP address and the port number of the SIP terminal 200, as identification information for identifying the SIP terminal 200 which is the reception source of a request for establishing the TLS connection. The port number is not essential, and the reception-TLS connection address/port can be configured to set only the IP address as the identification information.

The encryption algorithm ID expresses information that identifies an encryption algorithm of encrypting transmission data or decrypting reception data. The encryption parameter expresses a parameter for the encryption relevant to the established TLS connection.

The storage unit 120 can be configured by any storage medium generally used, such as a hard disk drive (HDD), an optical disk, a memory card, and a random access memory (RAM).

Referring back to FIG. 2, the forecast table 122 stores information specifying the SIP terminal 200 which becomes a transfer destination of the SIP message to be transferred. FIG. 4 is a schematic diagram for explaining the detailed data structure of the forecast table 122 according to the first embodiment.

As shown in FIG. 4, the forecast table 122 stores the reception-TLS connection address/port and a forecast-SIP message transfer destination, by relating them to each other. The forecast-SIP message transfer destination is set with identification information (the IP address and the port number) that identifies the SIP terminal 200 to be forecast as the transfer destination of the SIP message.

The obtaining unit 104 references the forecast table 122 to forecast the SIP message transfer destination corresponding to the SIP terminal 200 of the request source, when a request for establishing the TLS connection is received. The information to be stored in the forecast table 122 can be a value obtained in advance, or can be statistically estimated from an SIP message transferred in the past. In the case of statistically estimating the information to be stored in the forecast table 122, the SIP terminal 200 to which the SIP messages are transferred most in the past can be set. Plural forecast-SIP message transfer destinations can be also stored in relation to one reception-TLS connection address/port.

Referring back to FIG. 2, the transmitting-and-receiving unit 101 transmits and receives messages to and from an external device. For example, in transmitting an SIP message, the transmitting-and-receiving unit 101 receives SIP message data from the message processing unit 102, and requests the connection establishing unit 103 to establish a TLS connection to be used to transmit the SIP message. When a usable TLS connection is already present and when the connection establishing unit 103 manages the TLS connection, the transmitting-and-receiving unit 101 obtains the information concerning this connection from the connection establishing unit 103. The transmitting-and-receiving unit 101 encrypts the SIP message using an encryption parameter associated with the TLS connection, and transmits the SIP message to the network.

When the SIP message is received, the transmitting-and-receiving unit 101 specifies an encryption parameter associated with the received TLS connection by using the connection establishing unit 103, and decrypts the received SIP message by using the specified encryption parameter. The transmitting-and-receiving unit 101 transfers the decrypted SIP message data to the message processing unit 102.

The message processing unit 102 carries out various kinds of processing to distribute the SIP message as a basic function of the SIP proxy 100, following the basic specification of the SIP shown in the above mentioned "RFC 3261, SIP:Session Initiation Protocol" or the like. For example, the message processing unit 102 receives the SIP message data from the transmitting-and-receiving unit 101, interprets the received SIP message or assembles the SIP message to be transmitted, and transfers the SIP message to be transmitted, to the transmitting-and-receiving unit 101.

The message processing unit 102 can be configured to determine a transmission destination by referencing the SIP location server (not shown) present inside the SIP proxy 100 or on the network, according to need, at the time of assembling the SIP message data.

The connection establishing unit 103 establishes the TLS connection according to a request from other constituent unit. The connection establishing unit 103 also breaks the established TLS connection according to a request from other constituent units.

For example, the connection establishing unit 103 executes the TLS handshake protocol, and stores the encryption parameter to encrypt and decrypt the TLS obtained by the TLS handshake into the connection management table 121. To break the TLS connection, the connection establishing unit 103 deletes the corresponding entry from the connection management table 121. When the IP address and the port number of the SIP terminal 200 as the reception source of the request for establishing the TLS connection are notified, the connection establishing unit 103 references the connection management table 121, and specifies the corresponding encryption algorithm ID and the corresponding encryption parameter.

The obtaining unit 104 receives the address information of the SIP terminal 200 of the transmission source included in the message received from the transmitting-and-receiving unit 101, and obtains the forecast-SIP message transfer destination corresponding to the received address information, from the forecast table 122. The address of the SIP terminal 200 forecast as the transfer destination of the SIP message to be transferred thereafter can be obtained, in the manner as described above. The obtaining unit 104 notifies the connection establishing unit 103 about the request for establishing the TLS connection corresponding to the SIP terminal 200 forecast as the transfer destination.

The detailed configuration of the SIP terminal 200 is explained next. FIG. 5 is a block diagram of the configuration of the SIP terminal 200 according to the first embodiment. As shown in FIG. 5, the SIP terminal 200 includes a transmitting-and-receiving unit 201, a message processing unit 202, a connection establishing unit 203, and an application 204.

The transmitting-and-receiving unit 201 transmits and receives a message to and from an external device. For example, at the time of transmitting an SIP message, the transmitting-and-receiving unit 201 receives the SIP message data from the message processing unit 202, and requests the connection establishing unit 203 described later to establish a TLS connection to be used to transmit the SIP message. When a usable TLS connection is already present and also when the connection establishing unit 203 manages this TLS connection, the transmitting-and-receiving unit 201 obtains information concerning this connection from the connection establishing unit 203. The transmitting-and-receiving unit 201 encrypts the SIP message based on the encryption parameter associated with the TLS connection, and transmits the encrypted SIP message to the network.

When the SIP message is received, the transmitting-and-receiving unit 201 specifies the encryption parameter associated with the received TLS connection, using the connection establishing unit 203, and decrypts the received SIP message, using the specified encryption parameter. The transmitting-and-receiving unit 201 transfers the decrypted SIP message data to the message processing unit 202.

The message processing unit 202 composes the SIP message, following the basic specification of SIP UA (User Agent) as shown in the above mentioned "RFC 3261, SIP: Session Initiation Protocol" or the like, and transmits the SIP message to the transmitting-and-receiving unit 201. The message processing unit 202 also interprets the SIP message received from the transmitting-and-receiving unit 201. The composition and interpretation of the SIP message are executed according to a request of the application 204 described later.

The connection establishing unit 203 carries out the process concerning the establishment and break of the TLS connection, like the connection establishing unit 103 of the SIP proxy 100. For example, the connection establishing unit 203 executes the TLS handshake protocol, and stores and manages encryption parameters to encrypt and decrypt the TLS in the storage unit (not shown). The connection establishing unit 203 manages the information concerning the established connection, by using a table similar to the connection management table 121 shown in FIG. 3. Because the management method is similar to that of the connection establishing unit 103, illustrations and explanations of this method will be omitted.

The application 204 includes a function that operates based on the transmission and reception of a message using the SIP. For example, the application 204 corresponds to that at the terminal side of the hotline system using the SIP and that of the communication system using the SIP including an interphone and a receiver having a television monitor. When this application is used, it is easy to forecast a transfer destination, so the other communication party can be specified. Therefore, the effect of reducing the distribution delay due to the establishment of the connection beforehand by forecasting a transfer destination becomes large based on the method of the first embodiment.

Figure 6:
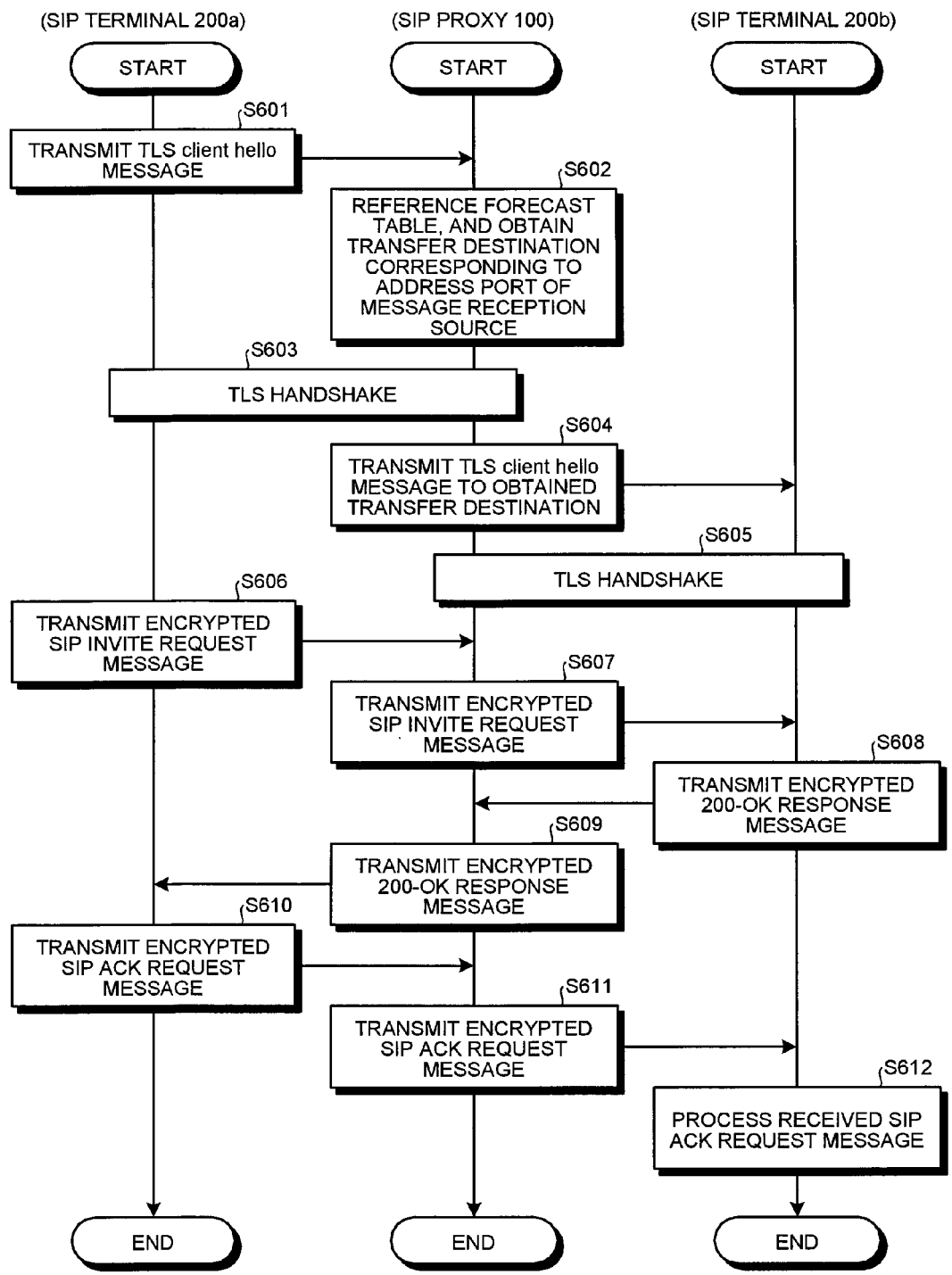
FIG. 6 is a flowchart of an overall flow of a relay process according to the first embodiment.

The relay process carried out by the SIP proxy 100 according to the first embodiment having the above configuration is explained next. FIG. 6 is a flowchart of an overall flow of the relay process according to the first embodiment. The operation that a user 1 on the SIP terminal 200a transmits an SIP INVITE request message to a user 2 on the SIP terminal 200b is explained below as an example.

It is assumed that information is stored in the forecast table of the storage unit of the SIP proxy 100 such that when the IP address of the SIP terminal 200a is the reception-TLS connection address/port, the IP address of the SIP terminal 200b and the normal port of the SIP can be forecast as the forecast-SIP message transfer destination.

First, the transmitting-and-receiving unit 201 of the SIP terminal 200a transmits a TLS client hello message to the SIP proxy 100 to request the establishment of the TLS connection (step S601).

It is assumed in the present process that the determination process of the transmission destination and the message preparation process are executed in the following order. First, when the user 1 on the SIP terminal 200a operates the application 204, the application 204 requests the message processing unit 202 to prepare the INVITE request message. The message processing unit 202 prepares the SIP INVITE request message addressed to the user 2, following the SIP specification, and determines that the SIP proxy 100 is the transmission destination of this message.

The prepared message is transferred to the transmitting-and-receiving unit 101. The transmitting-and-receiving unit 101 requests the connection establishing unit 203 to establish the TLS connection between the SIP terminal 200a and the SIP proxy 100. The connection establishing unit 203 of the SIP terminal 200a prepares the TLS client hello message, and transfers this message to the transmitting-and-receiving unit 101, to establish the TLS connection between the SIP terminal 200a and the SIP proxy 100.

The transmitting-and-receiving unit 201 transmits the TLS client hello message prepared in this way to the SIP proxy 100 (step S601), and the transmitting-and-receiving unit 101 of the SIP proxy 100 receives this message.

The transmitting-and-receiving unit 101 notifies the obtaining unit 104 about the IP address and the port number of the transmission source of the received TLS client hello message. The obtaining unit 104 references the forecast table 122, and obtains the forecast-SIP message transfer destination corresponding to the notified IP address and the port number of the transmission source (step S602). In this example, it is determined that the transfer destination of the SIP message received from the SIP terminal 200a is the SIP terminal 200b.

After the transfer destination is forecast in this way, the TLS connection is established with each SIP terminal 200, at the following steps S603 to S605. The TLS handshake between the SIP proxy 100 and the SIP terminal 200a at step S603, and the TLS handshake between the SIP proxy 100 and the SIP terminal 200b at steps S604 and S605 are executed in parallel. With this arrangement, a delay time generated in the connection establishing process can be minimized.

At step S603, the SIP proxy 100 executes the TLS handshake to establish the TLS connection between the SIP terminal 200a and the SIP proxy 100 (step S603).

Specifically, the connection establishing unit 203 of the SIP terminal 200a and the connection establishing unit 103 of the SIP proxy 100 establish the TLS connections, respectively, based on the transmission and reception of the TLS messages by the transmitting-and-receiving unit 201 and the transmitting-and-receiving unit 101, respectively. In the TLS handshake, about nine TLS messages are exchanged. Accordingly, the SIP terminal 200a and the SIP proxy 100 agree about the encryption parameter to be transmitted and received between them.

The obtaining unit 104 of the SIP proxy 100 requests the connection establishing unit 103 to establish the TLS connection between the SIP proxy 100 and the SIP terminal 200b. The connection establishing unit 103 prepares the TLS client hello message to establish the TLS connection between the SIP proxy 100 and the SIP terminal 200b, and transmits this message to the SIP terminal 200b via the transmitting-and-receiving unit 101 (step S604).

The transmitting-and-receiving unit 201 of the SIP terminal 200b receives the TLS client hello message from the SIP proxy 100, and notifies the connection establishing unit 203 about this message. The connection establishing unit 203 executes the TLS handshake to establish the TLS connection between the SIP proxy 100 and the SIP terminal 200b (step S605). This process is similar to that carried out at step S603. Accordingly, the SIP terminal 200b and the SIP proxy 100 agree about the encryption parameter to transmit and receive the SIP message between the SIP terminal 200b and the SIP proxy 100.

When the TLS connection is established at step S603, the transmitting-and-receiving unit 201 of the SIP terminal 200a encrypts the SIP INVITE request message, using the encryption parameter managed by the connection establishing unit 203, and transmits the encrypted message to the SIP proxy 100, using the established TLS connection (step S606).

Next, the SIP proxy 100 transfers the received SIP INVITE request message to the SIP terminal 200b, in the following order (step S607).

First, the transmitting-and-receiving unit 101 of the SIP proxy 100 receives the SIP INVITE request message transmitted from the SIP terminal 200a, decrypts this message, using the encryption parameter stored in the connection management table 121, and transfers the decrypted message to the message processing unit 102.

The message processing unit 102 recognizes that the received SIP message is the SIP INVITE request message destined to the user 2. The message processing unit 102 references the Request-URI or the like in the SIP header, and determines the SIP terminal 200 that becomes the transfer destination of the message destined to the user 2. Alternatively, the message processing unit 102 can determine the transfer destination, by enquiring an SIP location server (not shown), for example.

When it is identified that the transmission destination of the SIP message destined to the user 2 is the SIP terminal 200b, the message processing unit 102 transfers the SIP message data to the transmitting-and-receiving unit 101, by setting the destination to the SIP terminal 200b. The transmitting-and-receiving unit 101 confirms that the TLS connection with the SIP terminal 200b is established at step S605, encrypts the SIP message using the encryption parameter stored in the connection management table 121, and distributes the encrypted SIP message to the SIP terminal 200b, using the TLS connection already established between SIP terminal 200a and the SIP proxy 100 (step S607).

When the forecast transfer destination is different from the actual transfer destination, the TLS connection established beforehand cannot be used. Therefore, the message processing unit 102 needs to encrypt the SIP message after establishing the TLS connection with the SIP terminal 200 of the actual transfer destination, and then transfer this message. In this case, the effect of increasing the transfer speed of the SIP message according to the present invention cannot be obtained.

Next, the SIP terminal 200b transmits a response to the received SIP INVITE request message, to the SIP proxy 100, in the following order (step S608).

First, the transmitting-and-receiving unit 201 of the SIP terminal 200b receives the SIP INVITE request message, decrypts this message using the encryption parameter managed by the connection establishing unit 203, and transfers the decrypted message to the message processing unit 202. The message processing unit 202 processes the received SIP message, and recognizes that the received SIP message is the SIP INVITE request message destined to the user 2. The message processing unit 202 notifies the application 204 of the SIP terminal 200b about the SIP message destined to the user 2. The application 204 calls the user 2, for example, following this function.

When the user 2 responds to the call of the application 204, the message processing unit 202 prepares a 200-OK response message destined to the SIP terminal 200a. The transmitting-and-receiving unit 201 encrypts the prepared message, using the encryption parameter managed by the connection establishing unit 203, and distributes the encrypted message to the SIP proxy 100, using the TLS connection already established between the SIP proxy 100 and the SIP terminal 200a (step S608).

Next, the SIP proxy 100 transfers the received 200-OK response message to the SIP terminal 200a, in the following order (step S609).

First, the transmitting-and-receiving unit 101 of the SIP proxy 100 receives the 200-OK response message, decrypts this message using the encryption parameter stored in the connection management table 121, and transfers the decrypted message to the message processing unit 102.

The message processing unit 102 recognizes that the received SIP message is the 200-OK response message destined to the user 1, and transfers the received SIP message to the transmitting-and-receiving unit 101 to transfer the message to the SIP terminal 200a. The transmitting-and-receiving unit 101 encrypts the 200-OK response message, using the encryption parameter stored in the connection management table 121, and distributes this message to the SIP terminal 200a, using the TLS connection already established between the SIP terminal 200a and the SIP proxy 100 (step S609).

Next, the SIP terminal 200a transmits a response to the received 200-OK response message, to the SIP proxy 100, in the following order (step S610).

First, the transmitting-and-receiving unit 201 of the SIP terminal 200a receives the 200-OK response message, decrypts this message using the encryption parameter managed by the connection establishing unit 203, and transfers the decrypted message to the message processing unit 202. The message processing unit 202 recognizes that the received response message is the one in response to the SIP INVITE request message destined to the user 2. The application 204 can notify the user 1.

The message processing unit 202 of the SIP terminal 200a prepares an SIP ACK request message destined to the user 2. The transmitting-and-receiving unit 201 encrypts the prepared message, using the encryption parameter stored in the connection establishing unit 203, and distributes the encrypted message to the SIP proxy 100, using the TLS connection already established between the SIP proxy 100 and the SIP terminal 200a (step S610).

Next, the SIP proxy 100 transfers the received SIP ACK request message to the SIP terminal 200b, in the following order (step S611).

The transmitting-and-receiving unit 101 of the SIP proxy 100 receives the SIP ACK request message transmitted from the SIP terminal 200a, decrypts the received message using the encryption parameter stored in the connection management table 121, and transfers the decrypted message to the message processing unit 102.

The message processing unit 102 recognizes that the received SIP message is the SIP ACK request message destined to the user 2. The message processing unit 102 references the Request-URI of the SIP header and the like, and determines the SIP terminal 200 that becomes the transfer destination of the message destined to the user 2.

When it is identified that the transmission destination of the message destined to the user 2 is the SIP terminal 200b, the message processing unit 102 transfers the SIP message data to the transmitting-and-receiving unit 101, by setting the destination to the SIP terminal 200b. The transmitting-and-receiving unit 101 encrypts the SIP message, using the encryption parameter stored in the connection management table 121, and distributes the encrypted SIP message to the SIP terminal 200b, using the TLS connection already established between the SIP terminal 200a and the SIP proxy 100 (step S611).

Next, the SIP terminal 200b processes the received SIP ACK request message, in the following order (step S612).

First, the transmitting-and-receiving unit 201 of the SIP terminal 200b receives the SIP ACK request message, decrypts this message using the encryption parameter managed by the connection establishing unit 203, and transfers the decrypted message to the message processing unit 202. The message processing unit 202 recognizes that the received message is the SIP ACK request message destined to the user 2. In this case, the application 204 can notify the user 2.

As explained above, according to the first embodiment, at the moment when the request for establishing the TLS connection (the TLS client hello message) is received, the TLS connection can be established in advance by forecasting a transfer destination of the SIP message (the SIP INVITE request message and the like) to be received later. Based on this method, delay of the message transfer can be reduced from that according to the conventional method of establishing the TLS connection after receiving the SIP message (the SIP INVITE request message and the like) to be transferred.

Figure 7:
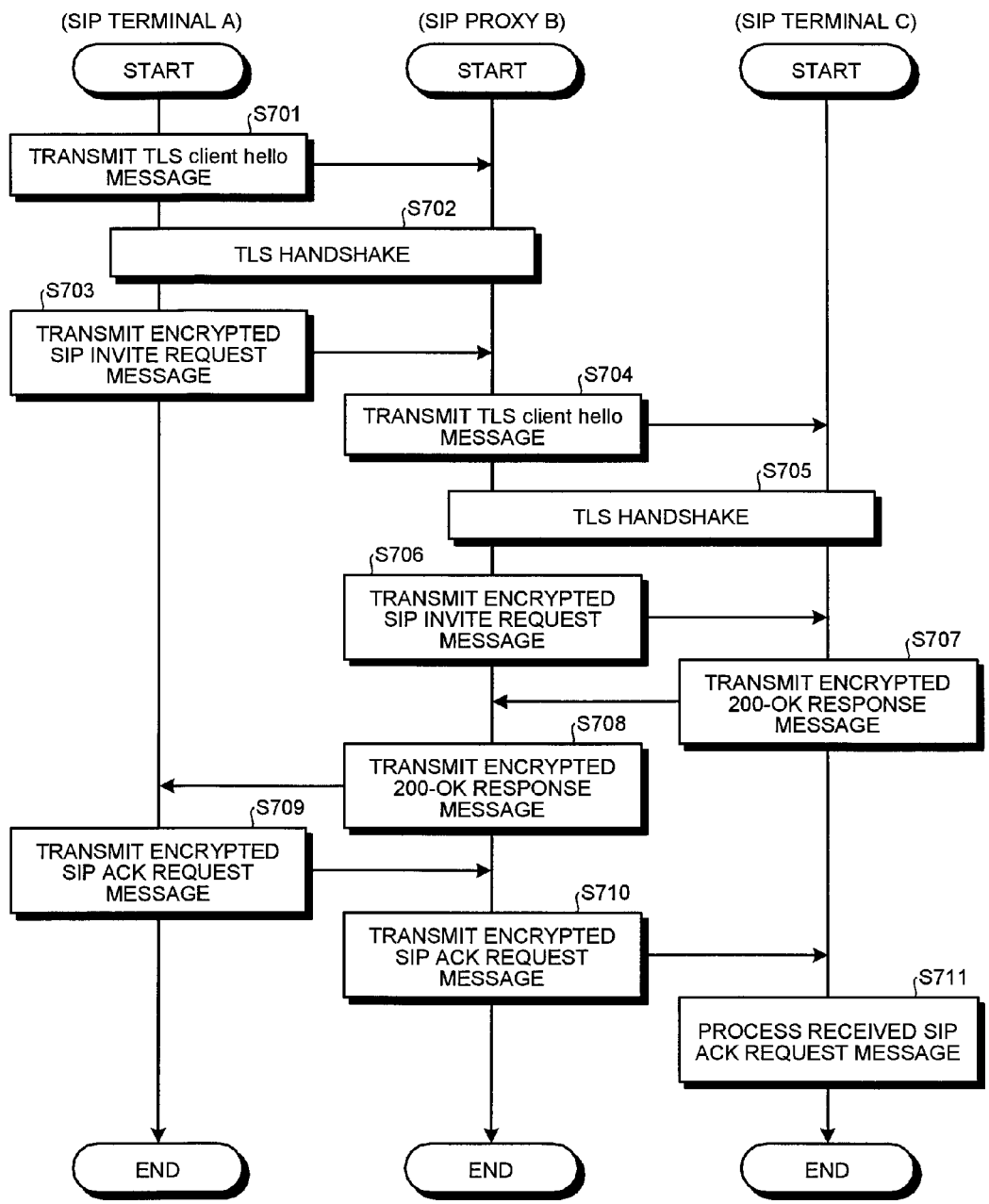
FIG. 7 is a flowchart of an overall flow of a relay process according to a conventional SIP proxy.

The outline of the relay process according to the conventional method is explained next. FIG. 7 is a flowchart of the overall flow of the relay process according to the conventional SIP proxy.

The conventional method is different from the method according to the first embodiment shown in FIG. 6, in that the forecast process of the transfer destination at step S602 is not present in the conventional method. The conventional method is also different in that the TLS handshake between the conventional SIP proxy (hereinafter, "SIP proxy B") and the SIP terminal at the transmission destination (hereinafter, "SIP terminal C") is executed after the SIP INVITE request message is received (steps S704 and S705).

The processes at steps S701, S702, and S703 are similar to those at steps S601, S603, and S606 shown in FIG. 6, respectively.

After the SIP terminal at the transmission source (hereinafter, "SIP terminal A") transmits the SIP INVITE request message at step S703, the SIP proxy B receives the SIP INVITE request message from the SIP terminal A, and decrypts the received message using the encryption parameter. The SIP proxy B processes the received message following the SIP specification, and recognizes that the received SIP message is the SIP INVITE request message destined to the user 2.

When the SIP proxy B identifies the SIP terminal C as the transmission destination of the message destined to the user 2, the SIP proxy B prepares the TLS client hello message to establish the TLS connection between the SIP terminal C and the SIP proxy B, and transmits the generated message to the SIP terminal C (step S704).

The TLS handshake between the SIP proxy B and the SIP terminal C at step S705 is similar to that at step S605.

Next, when the TLS connection is established, the conventional SIP proxy B encrypts the SIP INVITE request message, using the encryption parameter, and transmits the encrypted message to the SIP terminal B, using the established TLS connection (step S706).

The 200-OK response transmission process and the SIP ACK request message transmission-and-reception process at steps S707 to S711 are similar to those at steps S608 to S612, and therefore explanations thereof will be omitted.

As explained above, according to the conventional method, after the SIP message transmitted at step S703 is received, the destination of the received SIP message is identified (step S704), and the TLS connection is established between the SIP proxy B and the identified destination (step S705). Therefore, delay occurs in the distribution time of the SIP message.

On the other hand, as explained with reference to FIG. 6, according to the method of the first embodiment, both the establishment of the TLS connection between the SIP proxy 100 and the SIP terminal 200a and the establishment of the TLS connection between the SIP proxy 100 and the SIP terminal 200b are carried out before the SIP message is received. Therefore, the SIP INVITE request message can be transferred at a high speed.

While it is explained above that only one SIP terminal 200 is used to establish the TLS connection beforehand, information of plural transfer destinations can be stored in the forecast table 122, and the TLS connection can be established between plural SIP terminals 200 and the SIP proxy 100 in parallel.

As explained above, according to the relaying apparatus of the first embodiment, when the request for establishing the TLS connection is received, the TLS connection can be established between the SIP entity of the distribution destination and the SIP proxy 100 beforehand, by forecasting the SIP entity by referencing the information stored in advance. Therefore, it is possible to reduce the delay in the message distribution time generated by the communication establishment process that the relaying apparatus executes to distribute the message.

A relaying apparatus according to a second embodiment stores information that specifies a transmission source included in the SIP message, and an SIP entity of a distribution destination, by relating them to each other, forecasts the SIP entity of the distribution destination by referencing the stored information, when the SIP message to be transferred is received, and executes beforehand the establishment of the TLS connection between the SIP entity and the relaying apparatus.

In the second embodiment, the configuration of the SIP proxy is different from that of the first embodiment, and other devices (the SIP terminal 200 and the router 300) and the network have configurations similar to those of the first embodiment. Therefore, explanations of these configurations will be omitted.

Figures 8, 9:
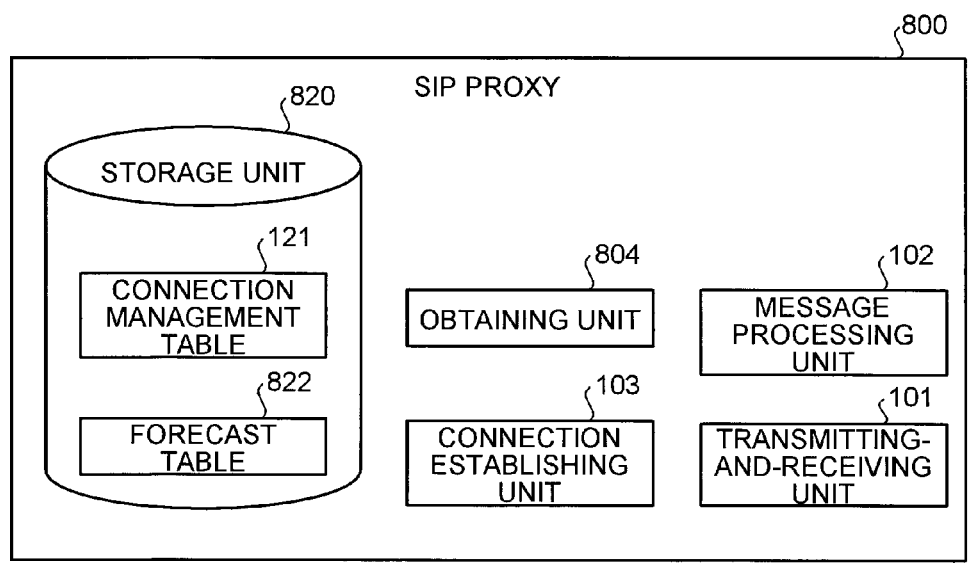
FIG. 8 is a block diagram of a configuration of an SIP proxy according to a second embodiment of the present invention.
FIG. 9 is a schematic diagram for explaining a detailed data structure of a forecast table according to the second embodiment.

FIG. 8 is a block diagram of a configuration of an SIP proxy 800 according to the second embodiment. As shown in FIG. 8, the SIP proxy 800 includes a storage unit 820, the transmitting-and-receiving unit 101, the message processing unit 102, the connection establishing unit 103, and an obtaining unit 804.

In the second embodiment, the data structure of information stored in the storage unit 820 and the function of the obtaining unit 804 are different from those of the first embodiment. Other configurations and functions are similar to those shown in the block diagram in FIG. 1 that depicts the configuration of the SIP proxy 100 according to the first embodiment. Therefore, these constituent elements are denoted with like reference numerals, and explanations thereof will be omitted.

The storage unit 820 stores various kinds of information used to relay messages, like the storage unit 120 according to the first embodiment, and stores the connection management table 121 and a forecast table 822. The data structure of the connection management table 121 is similar to that according to the first embodiment shown in FIG. 3, and therefore explanations thereof will be omitted.

The forecast table 822 according to the second embodiment stores information to specify the SIP terminal 200 that becomes the transfer destination of the SIP message to be transferred from the information included in the SIP message. FIG. 9 is a schematic diagram for explaining a detailed data structure of the forecast table 822 according to the second embodiment.

As shown in FIG. 9, the forecast table 822 stores a method name that identifies a kind of an SIP message, a transmission source URI of the SIP message, a contact address, and the forecast-SIP message transfer destination, by relating them to each other.

The method name is set with names corresponding to the SIP method, such as "Publish" and "Register". The transmission source URI represents the URI included in the From header of the SIP message, for example. The contact address represents the URI included in the Contact header of the SIP message, for example.

The information related to the forecast-SIP message transfer destination is not limited to the above information. All information within the SIP message including the information of the body part of the SIP message can be also related to the forecast-SIP message transfer destination. For example, the forecast-SIP message transfer destination can be determined by a media type stored in the Succession Description Protocol (SDP) of the body part.

Referring back to FIG. 8, the obtaining unit 804 receives the method name of the received message and the address information of the transmission source URI and the contact address, from the transmitting-and-receiving unit 101, and obtains the forecast-SIP message transfer destination corresponding to the method name and the address information received, from the forecast table 822.

Figure 10:
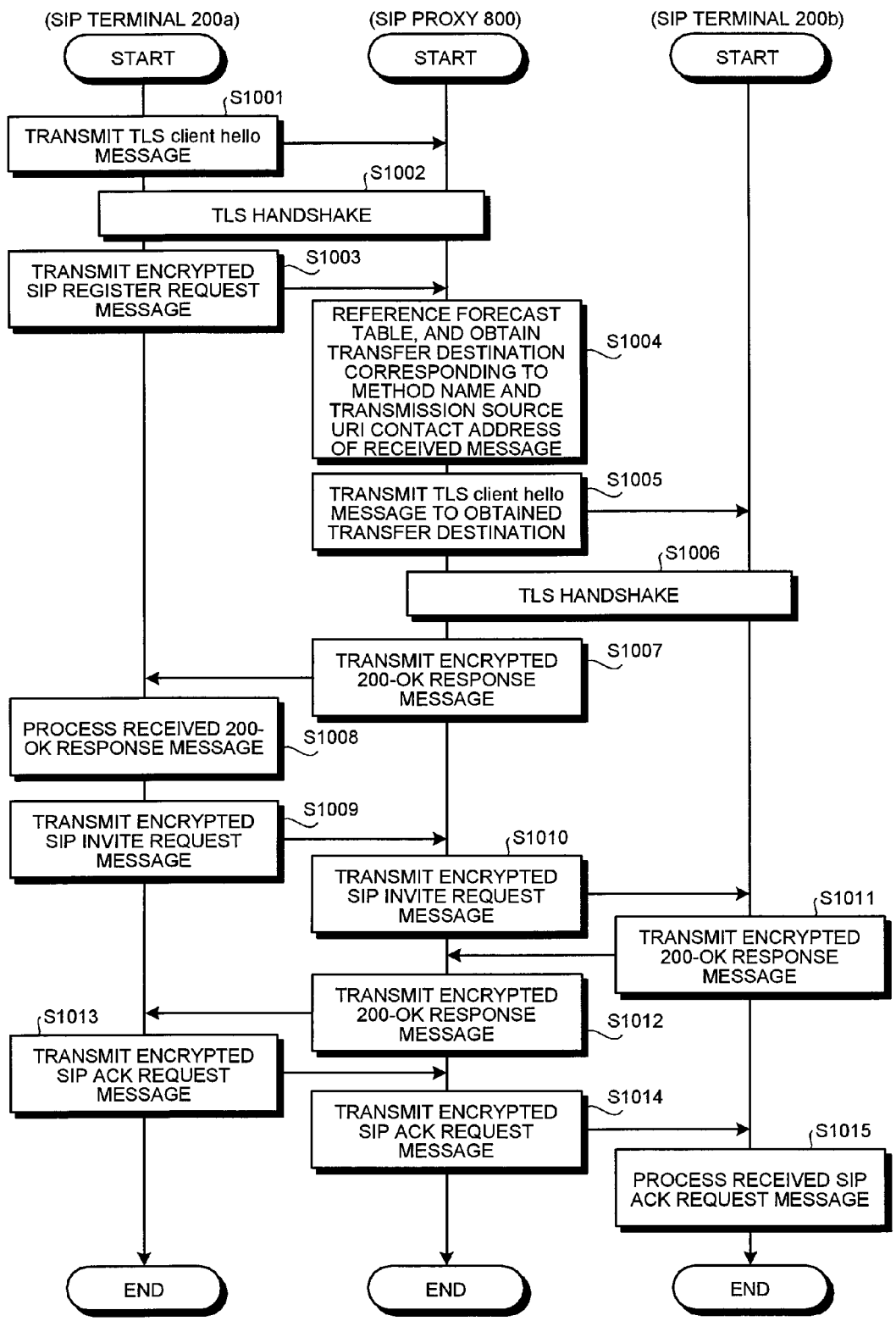
FIG. 10 is a flowchart of an overall flow of a relay process according to the second embodiment.

The relay process carried out by the SIP proxy 800 according to the second embodiment having the above configuration is explained with reference to FIG. 10. FIG. 10 is a flowchart of an overall flow of the relay process according to the second embodiment.

It is explained below an example of the forecasting of a transfer destination address of an SIP message such as the SIP INVITE request message to be received later, from the information (the From header information, the contact address information, etc.) included in the SIP Publish message or the SIP register message as the SIP message exchanged beforehand.

The SIP Register carried out beforehand corresponds to the operation executed by the normal system that connects the SIP terminal 200 to the SIP system and registers the address.

The SIP Publish carried out beforehand corresponds to the operation executed by the system that transmits the SIP message such as the SIP Publish at the timing of (1) lifting the receiver, (2) pushing the first dial, (3) off-hooking, and (4) starting the call interface, at the SIP terminal 200, and shares the state of the SIP terminal 200 in a part of the SIP system.

The second embodiment can be automatically applied to the system (such as the hotline system) that executes the SIP INVITE to a specific URI after the SIP Register and the SIP Publish are carried out, in these systems.

In this case, it is assumed that the forecast table 822 of the storage unit 820 in the SIP proxy 800 stores information such that the IP address and the SIP normal port of the SIP terminal 200b are forecast as the forecast-SIP message transfer destination, when the method is the SIP Register or the SIP Publish and when the transmission source URI is the user 1 on the SIP terminal 200a.

At first, the transmitting-and-receiving unit 201 of the SIP terminal 200a transmits the TLS client hello message to the SIP proxy 800 to request the establishment of the TLS connection (step S1001).

It is assumed in the present process that the determination process of the transmission destination and the message preparation process are executed in the following order. First, when the user 1 on the SIP terminal 200a operates the application 204, the application 204 requests the message processing unit 202 to prepare an SIP REGISTER request message or an SIP PUBLISH request message. The message processing unit 202 prepares the message following the SIP specification, and determines that the SIP proxy 800 is the transmission destination of this message.

The prepared message is transferred to the transmitting-and-receiving unit 101. The transmitting-and-receiving unit 101 requests the connection establishing unit 203 to establish the TLS connection between the SIP terminal 200a and the SIP proxy 800. The connection establishing unit 203 of the SIP terminal 200a prepares the TLS client hello message, and transfers this message to the transmitting-and-receiving unit 101, to establish the TLS connection between the SIP terminal 200a and the SIP proxy 800.

The transmitting-and-receiving unit 201 transmits the TLS client hello message prepared in this way to the SIP proxy 800 (step S1001), and the transmitting-and-receiving unit 101 of the SIP proxy 800 receives this message.

Because the TLS handshake at step S1002 is similar to that at step S603 shown in FIG. 6, this explanation is omitted.

After the TLS connection is established, the transmitting-and-receiving unit 201 of the SIP terminal 200a encrypts the SIP REGISTER request message or the SIP PUBLISH request message, using the encryption parameter managed by the connection establishing unit 203, and transmits the encrypted message to the SIP proxy 800, using the established TLS connection (step S1003). (FIG. 10 shows a state of the SIP REGISTER request message.)

The transmitting-and-receiving unit 101 of the SIP proxy 800 receives the SIP REGISTER request message or the SIP PUBLISH request message, decrypts this message using the encryption parameter stored in the connection management table 121, and transfers the decrypted message to the message processing unit 102. The message processing unit 102 processes the received SIP message following the SIP specification.

The transmitting-and-receiving unit 101 notifies the obtaining unit 804 about the method name of the received SIP message, and the transmission source URI and the contact address obtained from the From header value. The obtaining unit 804 references the forecast table 822, and obtains the forecast-SIP message transfer destination corresponding to the method name, the transmission source URI, and the contact address that are notified (step S1004). The forecast-SIP message transfer destination concerning the SIP message received from the SIP terminal 200a is determined as the SIP terminal 200b.

After the transfer destination is forecast, the TLS connection is established between the SIP terminal 200b and the SIP proxy 800 at the following steps S1005 and S1006. The establishment of the TLS connection at steps S1005 and S1006 and the response transmission process at step S1007 are executed in parallel.

The TLS handshake at steps S1005 and S1006 is similar to that at steps S604 and S605 in FIG. 6, and therefore explanations thereof will be omitted. At step S1007, the process is carried out in the following order according to a kind of the received message.

When the received message is the SIP REGISTER request message, the message processing unit 102 registers AoR (Address of Record) and the contact address shown in the SIP REGISTER request message, into the SIP location server. The message processing unit 102 also prepares the 200-OK response message destined to the SIP terminal 200a as the response message to the SIP REGISTER request message, following the SIP specification, and transfers the prepared message to the transmitting-and-receiving unit 101.

On the other hand, when the received message is the SIP PUBLISH request message, the message processing unit 102 references the Request-URI of the SIP header or the like, and determines the transfer destination of the received SIP message. For this purpose, the message processing unit 102 can enquire the SIP location server, for example. The message processing unit 102 transfers the SIP message data to the transmitting-and-receiving unit 101, destined to the determined transfer destination. The transmitting-and-receiving unit 101 requests the connection establishing unit 103 to establish the TLS connection between the message transfer destination and the SIP proxy 800. The connection establishing unit 103 of the SIP proxy 800 prepares the TLS client hello message to establish the TLS connection between the message transfer destination and the SIP proxy 800, and transmits the prepared message to the transfer destination via the transmitting-and-receiving unit 101. While detailed explanations and illustrations will be omitted, the connection establishing unit 103 thereafter establishes the TLS connection, following the normal SIP PUBLISH message processing sequence, and transfers the SIP PUBLISH request message. The transmitting-and-receiving unit 101 receives the 200-OK response message corresponding to the SIP PUBLISH request message, from the message transfer destination, decrypts the received message using the decryption parameter stored in the connection management table 121, and transfers the decrypted message to the message processing unit 102. The message processing unit 102 recognizes that the received SIP message is destined to the user 1, and transfers this SIP message to the transmitting-and-receiving unit 101 to transfer this message to the SIP terminal 200a.

The transmitting-and-receiving unit 101 encrypts the 200-OK response message corresponding to the SIP REGISTER request message or the SIP PUBLISH request message, using the encryption parameter managed by the connection establishing unit 203, and distributes the encrypted message to the SIP terminal 200*a*, using the already-established TLS connection between the SIP terminal 200*a* and the SIP proxy 800 (step S1007).

The SIP terminal 200*b* processes the received 200-OK response message in the following order (step S1008).

First, the transmitting-and-receiving unit 201 of the SIP terminal 200*a* receives the 200-OK response message, decrypts this message using the encryption parameter managed by the connection establishing unit 203, and transfers the decrypted message to the message processing unit 202. The message processing unit 202 recognizes that the received response message is the one in response to the SIP REGISTER request message or the SIP PUBLISH request message. The application 204 can notify the user 1.

Based on the setting on the SIP terminal 200*a*, the system automatically, or the user 1, operates the application 204. As a result, the application 204 requests the message processing unit 202 to prepare the SIP INVITE request message destined to the user 2. The message processing unit 202 prepares the SIP INVITE request message destined to the user 2 following the SIP specification, and determines that the SIP proxy 800 is the transmission destination of this message.

The prepared message is transferred to the transmitting-and-receiving unit 201. The transmitting-and-receiving unit 201 encrypts the SIP INVITE request message, using the encryption parameter managed by the connection establishing unit 203, and distributes the encrypted message to the SIP proxy 800, using the TLS connection already established between the SIP proxy 800 and the SIP terminal 200*a* (step S1009).

The SIP INVITE request message transfer process, the 200-OK response transmission process, and the SIP ACK request message transmission/reception process at steps S1010 to S1015 are similar to those carried out by the SIP proxy 100 at steps S607 to S612 in the first embodiment. Therefore, explanations thereof will be omitted.

As explained above, according to the second embodiment, at the moment when the SIP REGISTER request message or the SIP PUBLISH request message to be transmitted before receiving the SIP message to be transferred (the SIP INVITE request message) is received, the transfer destination of the SIP message to be received later is forecast so that the TLS connection can be established beforehand. Accordingly, delay of the message transfer can be reduced.

Figure 11:
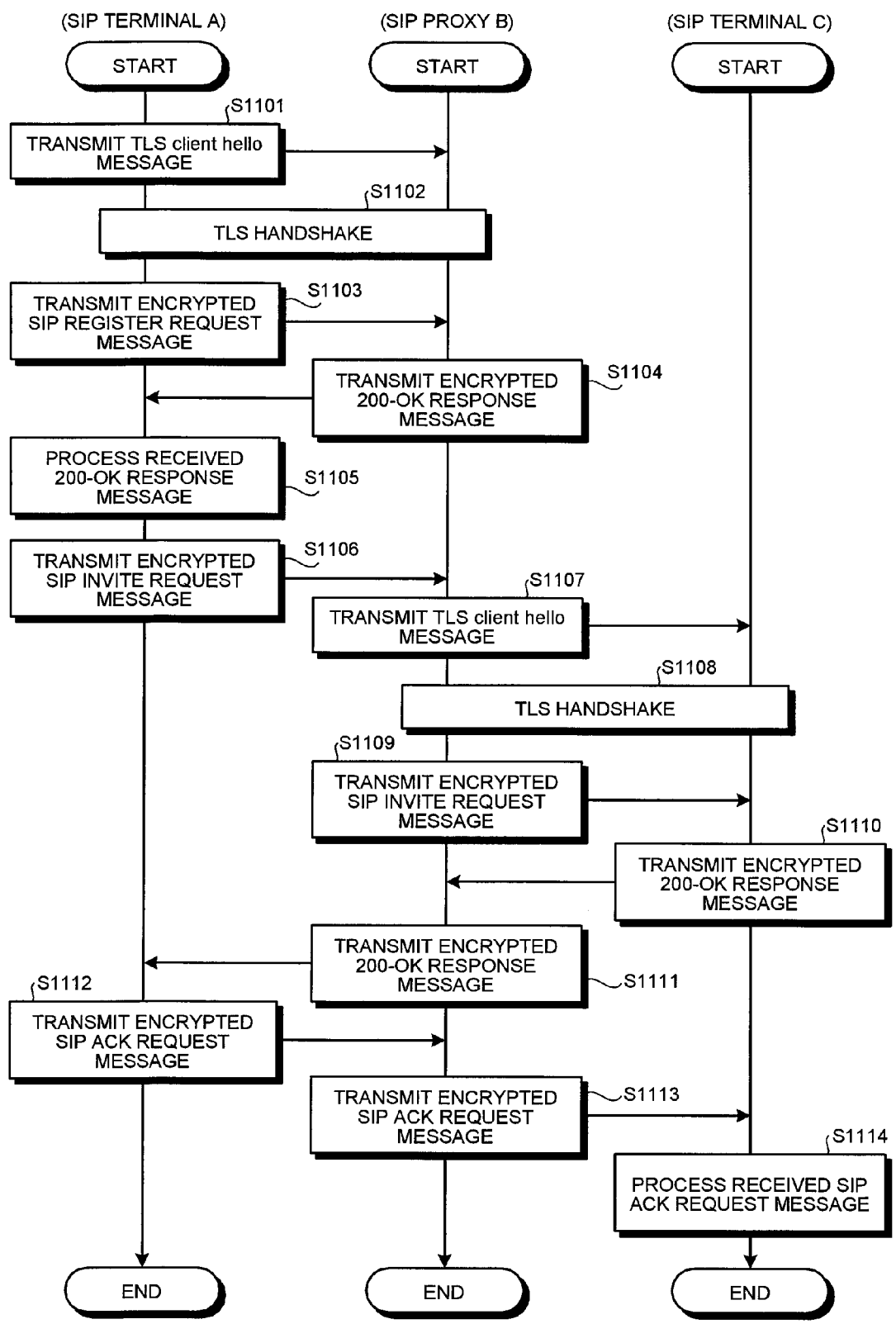
FIG. 11 is another flowchart of an overall flow of the relay process according to the conventional SIP proxy.

The outline of the relay process according to the conventional method is explained next. FIG. 11 is a flowchart of the overall flow of the relay process according to the conventional SIP proxy.

The conventional method is different from the method according to the second embodiment shown in FIG. 10, in that the forecast process of the transfer destination at step S1004 is not present in the conventional method. The conventional method is also different in that the TLS handshake between the SIP proxy B and the SIP terminal C is executed after the SIP INVITE request message is received (steps S1107 and S1108).

The processes at steps S1101 to S1103 are similar to those at steps S1001 to S1003 shown in FIG. 10, respectively. The processes at steps S1104 to S1106 are similar to those at steps S1007 to S1009 shown in FIG. 10, respectively.

After the SIP terminal A transmits the SIP INVITE request message at step S1106, the SIP proxy B receives the SIP INVITE request message from the SIP terminal A, and decrypts the received message using the encryption parameter. The SIP proxy B processes the received message following the SIP specification, and recognizes that the received SIP message is the SIP INVITE request message destined to the user 2.

When the SIP proxy B identifies the SIP terminal C as the transmission destination of the message destined to the user 2, the SIP proxy B prepares the TLS client hello message to establish the TLS connection between the SIP terminal C and the SIP proxy B, and transmits the generated message to the SIP terminal C (step S1107).

The TLS handshake between the SIP proxy B and the SIP terminal C at step S1108 is similar to that at step S1006 shown in FIG. 10. The processes at steps S1109 to S1114 are similar to those at steps S1010 to S1015 shown in FIG. 10.

As explained above, according to the conventional method, after the SIP message transmitted at step S1106 is received, the destination of the received SIP message is identified (step S1107), and the TLS connection is established between the SIP proxy B and the identified destination (step S1108). Therefore, delay occurs in the distribution time of the SIP message.

On the other hand, as explained with reference to FIG. 10, according to the method of the second embodiment, the SIP INVITE request message is transferred at a high speed, to execute the establishment of the TLS connection between the SIP proxy 800 and the SIP terminal 200*b*, before the SIP INVITE request message is received.

That is, the process of establishing the TLS connection between the SIP proxy 800 and the SIP terminal 200*b* (step S1006) and the process of the SIP REGISTER request message or the SIP PUBLISH request message (step S1007) are executed simultaneously beforehand. Therefore, no delay occurs in the process of establishing a new connection at the time of transferring the SIP INVITE request message (step S1009).

As explained above, according to the relaying apparatus of the second embodiment, when the SIP message to be transferred is received, the TLS connection can be established between the SIP entity of the distribution destination and the SIP proxy 800 beforehand, by forecasting the SIP entity by referencing the information stored in advance. Therefore, it is possible to reduce the delay in the message distribution time generated by the communication establishment process that the relaying apparatus executes to distribute the message.

While examples of using the SIP as the signaling protocol are explained in the above embodiments, the applicable protocols are not limited to those described in the embodiments. The invention can be also applied to all signaling protocols such as the H.323, MGCP (Media Gateway Control Protocol) and the Megaco (Media Gateway Control) that are conventionally used. In the above embodiments, the use of the TLS is explained as the encryption protocol. Alternatively, other protocols such as the IPsec (Security Architecture for Internet Protocol) can be also used. When the IPsec is used for the encryption protocol, the ISAKMP (Internet Security Association and Key Management Protocol) packet to start a key exchange corresponds to the message (the TLS client hello message in the TLS) that requests the establishment of the connection.

Figure 12:
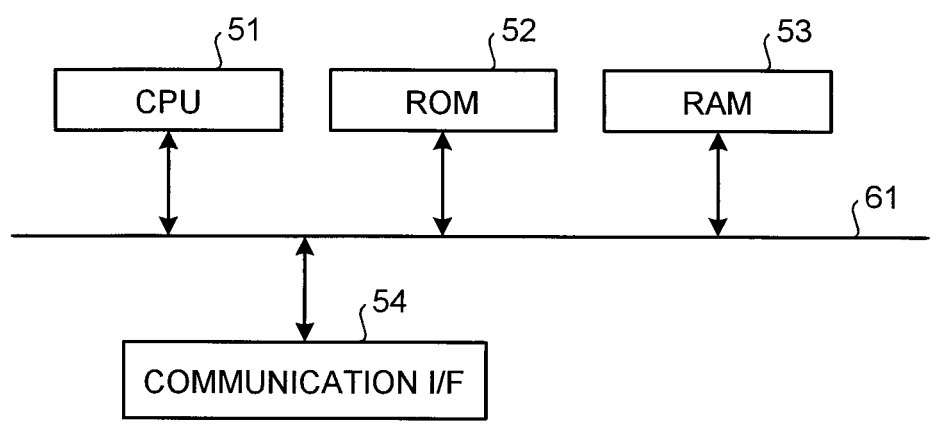
FIG. 12 is a schematic diagram for explaining a hardware configuration of the relay device according to the first or second embodiment.

A hardware configuration of the relaying apparatus according to the first or second embodiment is explained below with reference to FIG. 12. FIG. 12 is a schematic diagram for explaining the hardware configuration of the relaying apparatus according to the first or second embodiment.

The relaying apparatus according to the first or second embodiment includes a control device such as a CPU 51, storage devices such as a read only memory (ROM) 52 and a random access memory (RAM) 53, a communication interface (I/F) 54 that is connected to a network to carry out communications, external storage devices such as a hard disk drive (HDD), a compact disk (CD), and a drive unit, a display device such as a display unit, input devices such as a keyboard and a mouse, and a bus 61 that connects between the devices, and the relaying apparatus uses a normal computer.

A communication establishing program executed by the relaying apparatus according to the first or second embodiment is provided by being recorded on a computer-readable recording medium such as a compact disk-read only memory (CD-ROM), a flexible disk (FD), a compact disk recordable (CD-R), and a digital versatile disk (DVD), in a file of an installable format or an executable format.

The communication establishing program executed by the relaying apparatus according to the first or second embodiment can be provided by being stored in a computer connected to a network such as the Internet and downloaded via the network. The communication establishing program executed by the relaying apparatus according to the first or second embodiment can be also provided or distributed via a network such as the Internet.

The communication establishing program executed by the relaying apparatus according to the first or second embodiment can be provided by being incorporated in a ROM or the like in advance.

The communication establishing program executed by the relaying apparatus according to the first or second embodiment has a module configuration including the units described above (the transmitting-and-receiving unit, the message processing unit, the connection establishing unit, and the obtaining unit). The CPU 51 (processor) reads the communication establishing program from the above storage medium, and executes the program to load each unit on the main storage device, and each unit is generated on the main storage device, as actual hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A relaying apparatus that establishes secure connections with terminal devices and relays a transfer message transmitted and received between the terminal devices via the established secure connections, the relaying apparatus comprising:
    a storage unit configured to store first identification information for identifying a first terminal device and second identification information for identifying a second terminal device in association with each other, the second terminal device being forecasted as a transfer destination of the transfer message;
    a receiving unit configured to receive from the first terminal device a request message, the request message requesting to establish a first secure connection between the first terminal device and the relaying apparatus, the request message including the first identification information and not including the second identification information, and the request message being not transferred to the second terminal device;
    an obtaining unit configured to obtain from the storage unit the second identification information corresponding to the first identification information included in the request message received by the receiving unit;
    an establishing unit configured to establish a second secure connection between the relaying apparatus and the second terminal device identified by the second identification information obtained by the obtaining unit before the transfer message is received by the receiving unit from the first terminal device via the established first secure connection; and
    a sending unit configured to send the transfer message to the second terminal device via the established second secure connection.

2. The apparatus according to claim 1, wherein the receiving unit is configured to receive from the first terminal device a REGISTER message of a Session Initiation Protocol (SIP) as the request message.

3. The apparatus according to claim 1, wherein the receiving unit is configured to receive from the first terminal device the request message including an establishing request to establish the first secure connection according to a Transport Layer Security (TLS) protocol.

4. The apparatus according to claim 1, wherein the receiving unit is configured to receive from the first terminal device the request message including an establishing request to establish the first secure connection according to the IPsec protocol.

5. The apparatus according to claim 1, wherein the storage unit is configured to store the IP address of the first terminal device as the first identification information, and the second identification information in association with each other,
    the receiving unit is configured to receive from the first terminal device the request message including the IP address of the first terminal device as the first identification information, and
    the obtaining unit is configured to obtain from the storage unit the second identification information corresponding to the IP address included in the request message.

6. The apparatus according to claim 1, wherein the storage unit is configured to store the IP address of the first terminal device and a port number for establishing communications as the first identification information, and the second identification information in association with each other,
    the receiving unit is configured to receive from the first terminal device the request message including the IP address of the first terminal device and the port number as the first identification information, and
    the obtaining unit is configured to obtain from the storage unit the second identification information corresponding to the IP address and the port number included in the request message.

7. The apparatus according to claim 1, wherein the receiving unit is configured to receive from the first terminal device a PUBLISH message of the SIP as the request message.

8. The apparatus according to claim 1, wherein the storage unit is configured to store a Uniform Resource Identifier (URI) of the SIP corresponding to the first terminal device as the first identification information, and the second identification information in association with each other,
    the receiving unit is configured to receive from the first terminal device the request message including the URI as the first identification information, and
    the obtaining unit is configured to obtain from the storage unit the second identification information corresponding to the URI included in the request message.

9. The apparatus according to claim 1, wherein the storage unit is configured to store a contact address of the SIP corresponding to the first terminal device as the first identification information, and the second identification information in association with each other, the receiving unit is configured to receive from the first terminal device the request message including the contact address as the first identification information, and the obtaining unit is configured to obtain from the storage unit the second identification information corresponding to the contact address included in the request message.

10. The apparatus according to claim 1, wherein the storage unit is configured to store a kind of message, the first identification information, and the second identification information in association with each other, and the obtaining unit is configured to obtain from the storage unit the second identification information corresponding to the kind of the request message and the first identification information.

11. The apparatus according to claim 3, wherein the establishing unit is configured to establish the second secure connection between the second terminal device of the second identification information and the relay device according to the TLS protocol.

12. The apparatus according to claim 3, wherein the establishing unit is configured to establish the second secure connection between the second terminal device identified by the second identification information and the relay device according to the IPsec protocol.

13. A method of establishing secure connections between terminal devices and relaying a transfer message transmitted and received between the terminal devices via the established secure connections, the method comprising:

receiving from a first terminal device a request message, the request message requesting to establish a first secure connection between the first terminal device and the relaying apparatus, the request message including first identification information for identifying the first terminal device and not including the second identification information, and the request message being not transferred to the second terminal device;

obtaining from a storage unit the second identification information corresponding to the first identification information included in the request message, the storage unit storing the first identification information and the second identification information in association with each other, and the second terminal device being forecasted as a transfer destination of the transfer message;

establishing a second secure connection between the relaying apparatus and the second terminal device identified by the second identification information before receiving the transfer message from the first terminal device via the established first secure connection; and sending the transfer message via the established second secure connection to the second terminal device.

14. A non-transitory computer-readable medium storing programmed instructions that, when executed by a processor, cause the processor to perform a method for establishing secure connections with terminal devices and relaying a transfer message to be transmitted and received between the terminal devices via the established secure connections, the method comprising:

receiving from a first terminal device a request message, the request message requesting to establish a first secure connection between the first terminal device and the relaying apparatus, the request message including first identification information for identifying the first terminal device and not including the second identification information, and the request message being not transferred to the second terminal device;

obtaining from a storage unit the second identification information corresponding to the first identification information included in the request message, the storage unit storing the first identification information and the second identification information in association with each other, and the second terminal device being forecasted as a transfer destination of the transfer message;

establishing a second secure connection between the relaying apparatus and the second terminal device identified by the second identification information before receiving the transfer message from the first terminal device via the established first secure connection; and sending the transfer message via the established second secure connection to the second terminal device.

15. The apparatus according to claim 1, wherein the sending unit is configured to send the transfer message via the established second secure connection without establishing a new secure connection when the received transfer message includes the second identification information.

* * * * *